May 9, 1950 — C. R. KILLIAN — 2,507,411
ANIMAL RESTRAINER
Filed Jan. 30, 1947
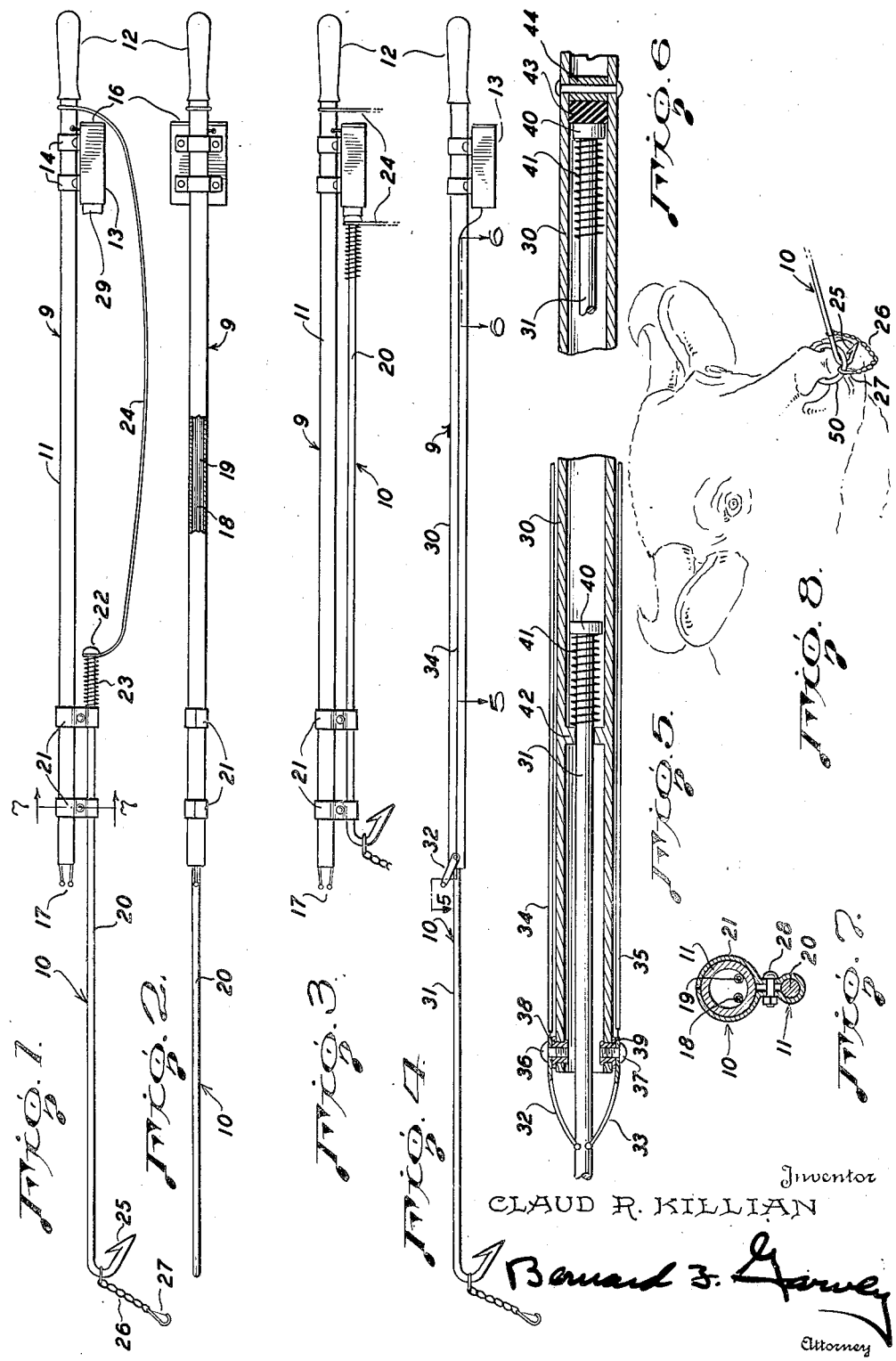
Inventor
CLAUD R. KILLIAN
Bernard F. Garvey
Attorney Patented May 9, 1950

2,507,411

UNITED STATES PATENT OFFICE 2,507,411

ANIMAL RESTRAINER

Claud R. Killian, Hayesville, N. C.

Application January 30, 1947, Serial No. 725,408

5 Claims. (Cl. 119—152)

My invention relates to an animal restrainer and more particularly to a device for controlling dangerous animals such as bulls.

An object of my invention is to provide a bull lead which can be hooked to the ring in a bull's nose.

Another object of my invention is to provide a rod with electrical shocking means to subdue a dangerous bull and prevent his goring the person approaching him.

A further object of my invention is to provide an animal catching device which automatically shocks the animal if it belligerently moves toward the catcher.

A further object of my invention is to provide a bull lead which may be hooked to the bull's nose ring at a safe distance and then securely fastened to the nose ring.

These and other objects of my invention will be apparent from the following description taken in conjunction with the appended drawings wherein:

Figure 1 is a side elevational view of one embodiment of my invention in condition of readiness for catching and holding a bull;

Figure 2 is a plan view partly in section of the same with chain and snap fastener omitted;

Figure 3 is a side elevational view of the same embodiment in condition for giving an unmanageable bull an electric shock;

Figure 4 is a side elevational view of another embodiment of my invention showing a different type of construction;

Figure 5 is an enlarged fragmentary sectional view in the plane of the line 5—5 of Figure 4;

Figure 6 is an enlarged fragmentary sectional view in the plane of the line 6—6 of Figure 4, showing the rod in retracted position;

Figure 7 is an enlarged sectional view in the plane of the line 7—7 of Figure 1; and Figure 8 is a fragmentary view illustrating the use of the invention when secured to the nose ring.

Referring now in greater detail to Figures 1, 2, 3, and 7, a hand rod generally designated 9 consists of tube 11 having a handle 12 at one end and a battery box 13 supported near the handle by conventional means 14. Door 16 allows access to the battery box for replacing the batteries. Contacts 17 are secured to the other end of tube 11 and are connected by means of wires 18 and 19 within tube 11 to the batteries in box 13. Contacts 17 have a spaced relationship so that when a part of an animal's body touches both of the contacts, a small amount of current will flow between the contacts through the animal's body. Batteries are used having a voltage such that a moderate shock is felt by the animal. The nose portion of an animal such as a bull is especially sensitive to such minor electric shocks and a bull, when shocked, is immediately subdued in spirit. It is not necessary to shock the bull often because the bull associates the sensation with the bull restraining device and the memory of the shocking sensation has a restraining influence.

A hook rod 10 is slidably engaged with the hand rod 9 by means of straps 21. As shown in Figure 7, straps 21 circumscribe tube 11 and hook rod 20 and are held securely by bolts 28. Rod 20 is free to move in straps 21 and is shown in the extended position in Figure 1. Rod 20 has at one end a spring 23 held in place by knob 22 and one of straps 21. Spring 23 acts to cushion the shock of hook rod 20 when it is rapidly extended. The other end of hook rod 20 has formed thereon a hook 25 for engagement with a nose ring of a bull. A chain 26 fastened to the hook, has at its other end a snap fastener 27.

A cord 24 is fastened to the end of hook rod 20 and to the handle end of hand rod 9 to permit retraction of the hook rod 10. A cushion 29 fastened to battery box 13 may be of a material such as rubber. Cushion 29 provides a resilient stop for hook rod 10 when it is retracted as shown in Figure 3.

In the operation of the animal restrainer, hook rod 10 is initially extended as shown in Figure 1. The bull is approached with the animal restrainer and hook 25 is hooked to nose ring 50. If the bull happens to be in a vicious mood, he may attack the person attempting to control him before there is opportunity to put hook 25 through the nose ring. In this event, the animal restrainer is held pointed at the approaching bull and his movement pushes hook rod 10 inwardly to the position shown in Figure 3. When the hook rod 10 is thus pushed inwardly, contacts 17 are exposed and come in contact with the bull. The bull then receives an electric shock and is discouraged from advancing further. The use of the animal restrainer is therefore automatic in that the bull receives an electric shock only when he advances towards the person attempting to capture him.

After hook 25 has been hooked to a nose ring 50, hook rod 10 may be more securely fastened to nose ring 50 by means of clasp 27 on chain 26. This is shown to advantage in Figure 8.

Figures 4, 5 and 6 illustrate another embodiment of my invention wherein hand rod 9 consists of tube 30, and hook rod 10 consists of rod 31 which is slidably mounted within tube 30. Contacts 32 and 33 are secured to tube 30 by means of screws 36 and 37 and are insulated from tube 30 by means of insulators 38 and 39. Wires 34 and 35 are connected to the contacts and run along the outside of tube 30 to battery box 13. Rod 31 has a knob 40 at one end and tube 30 has a shoulder 42, the knob 40 and shoulder 42 being operative to constrain spring 41 and thereby absorb the shock of rapid extension of rod 31. Knob 40 on rod 31 abuts against cushion 43 held in place by stop 44 as shown to advantage in Figure 6. Cushion 43 therefore acts to absorb the shock of rapid retraction of rod 31. The operation of the embodiment shown in Figures 4, 5 and 6 is, of course, similar to that described with reference to Figures 1, 2 and 3.

Although I have herein shown a preferred form of the invention, I am nevertheless aware that various changes may be made therein within the scope of the claims hereto appended.

What I claim is:

1. An animal restrainer comprising a rod, electrical means thereon for shocking the animal, and a hook slidably engaged with said rod adjacent said electrical means to permit contact of the latter with an animal engaged by the hook when the latter is retracted.

2. An animal restraining stick comprising a hand rod, a handle at one end of the hand rod and electrical shocking means at the other end, and a hook rod slidably engaged with the hand rod, the hook rod being extendable from the hand rod to catch the animal and being retractable to permit contact of the shocking means with the animal.

3. An animal restraining stick comprising a hand rod, a handle at one end of the hand rod and electrical shocking means at the other end, a hook rod slidably engaged with the hand rod, the hook rod being extendable from the hand rod to catch the animal and being retractable to permit contact of the shocking means with the animal when the hook is retracted, and means to cushion the movement of the hook rod at its limits of travel.

4. A bull controlling device comprising a hand rod, spaced electrical contacts on one end of the rod, a battery secured to the rod near the other end, wires connecting the battery to the contacts, and a hook rod in slidable engagement with the hand rod, the hook rod being extensible from the contact end of the hand rod to catch a bull and being retractable to permit contact of the electrical contacts on the hand rod with the bull.

5. An animal controlling device comprising a hand rod and a handle at one end thereof, electrical shocking means at the other end, a hook rod slidably engaged with the hand rod, the hook rod being extendable from the hand rod to catch the animal and being retractable toward the handle to permit contact of the shocking means with the animal, and clasp means on the hook member for engaging with a ring or halter on the animal.

CLAUD R. KILLIAN.

REFERENCES CITED

The following references are of record in the file of this patent:

UNITED STATES PATENTS

| Number | Name | Date |
|---|---|---|
| 408,309 | Krick | Aug. 6, 1889 |
| 427,549 | Burton | May 13, 1890 |
| 1,504,287 | Thurston | Aug. 12, 1924 |
| 1,752,397 | See | Apr. 1, 1930 |
| 2,041,944 | Mestekin | May 26, 1936 |
| 2,176,994 | Hansen et al. | Oct. 24, 1939 |

FOREIGN PATENTS

| Number | Country | Date |
|---|---|---|
| 20,777 | Great Britain | Sept. 25, 1902 |